United States Patent
Chaudhari et al.

[11] 3,948,739
[45] Apr. 6, 1976

[54] COATING COMPOSITIONS HARDENABLE BY IONIZATION BEAMS

[75] Inventors: Dinkar Chaudhari; Ernst Häring, both of Cologne; Arnold Dobbelstein, Junkersdorf; Wilfried Hoselmann, Cologne, all of Germany

[73] Assignee: BASF Farben & Fasern AG, Hamburg, Germany

[22] Filed: Oct. 9, 1973

[21] Appl. No.: 404,148

[30] Foreign Application Priority Data
Oct. 9, 1972 Germany............................ 2249446

[52] U.S. Cl.................... 204/159.22; 260/77.5 AN; 260/77.5 AP; 260/78.5 B; 260/78.5 E; 260/78.5 HC; 427/36
[51] Int. Cl.². C08F 2/46; C08F 20/20; C08F 22/22
[58] Field of Search... 260/78.4 E, 78.4 EP, 78.4 N, 260/78.5 B, 78.5 E, 78.5 HC, 77.5 AN, 77.5 AP; 204/159.14, 159.22

[56] References Cited
UNITED STATES PATENTS

| | | | |
|---|---|---|---|
| 3,224,989 | 12/1965 | Nevin...................................... | 260/23 |
| 3,378,527 | 4/1968 | Case et al. ............................. | 260/67 |
| 3,418,295 | 12/1968 | Schoenthaler................... | 260/80.72 |
| 3,448,089 | 6/1969 | Celeste .............................. | 260/78.5 |
| 3,507,821 | 4/1970 | Vasta................................. | 260/31.2 |
| 3,616,364 | 10/1971 | D'Alelio......................... | 204/159.14 |
| 3,773,856 | 11/1973 | Takiyama et al. ................... | 260/836 |
| 3,785,849 | 1/1974 | Parker et al. .................... | 117/93.31 |

FOREIGN PATENTS OR APPLICATIONS

| | | |
|---|---|---|
| 1,159,552 | 7/1969 | United Kingdom |
| 1,159,551 | 7/1969 | United Kingdom |

*Primary Examiner*—John Kight, III
*Attorney, Agent, or Firm*—Gilbert L. Wells

[57] ABSTRACT

Coating compositions hardenable by ionizing radiation comprising as binding agents a mixture of
  A. at least 1 unsaturated olefin compound containing urethane groups, and
  B. at least 1 further unsaturated olefin compound that may be copolymerized, characterized in that the unsaturated olefin compound (A) containing the urethane groups is a reaction product of a. a compound of the general formula

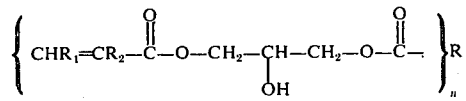

where $n$ is 1 or 2,
where R stands for a straigt chain or branched alkyl group of valence $n$,
where $R_1$ is hydrogen, methyl or the group

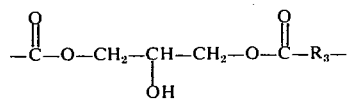

where $R_3$ is a monovalent alkyl residue and
where $R_2$ is hydrogen or methyl, and b. a compound containing at least 1 isocyanate group where the mixture of (A) and (B) may contain conventional additives of the lacquer industry.

6 Claims, No Drawings

COATING COMPOSITIONS HARDENABLE BY IONIZATION BEAMS

CROSS-REFERENCE TO A RELATED APPLICATION

Applicants claim priority under 35 U.S.C. 119 for application No. P 22 49 446.8, filed Oct. 9, 1972, in the Patent Office of the Federal Republic of Germany.

The disclosure of assignee's copending application Ser. No. 100,401, filed Dec. 21, 1970 now abandoned and the continuation-in-part thereof Ser. No. 404,660, filed Oct. 9, 1973, is incorporated herein to show the state of the art of method of curing compositions by ionizing radiation.

BACKGROUND OF THE INVENTION

The present invention relates to unsaturated olefin compounds containing urethane used as binding components in coating compositions, said compounds being hardened by ionizing beams or radiation.

It is known that unsaturated olefin organic compounds may be polymerized by being subjected to ionized beams. In practice however, only a few systems are suitable. Systems that may be polymerized and that may be used as coating means, must offer good film formation, good adhesion to different substrates, and a rapid speed of hardening as regards practice.

Hardening of coating compositions by means of electron beams offers this advantage, namely, that no after curing facilities of costly thermal or catalytic nature are required as are needed along with keeping the air clear in conventional lacquer drying ovens in order to remove the solvents accumulating in appreciable parts.

The German published application No. 1,644,798 and the British Pat. No. 1,159,551 disclose diisocyanate and hydroxy-alkyl-acrylate addition products, which when dissolved in unsaturated ethylene monomers, are deposited upon a substrate and are hardened by means of ionizing beams, however, the speed of hardening will not suffice for an industrial application.

SUMMARY OF THE INVENTION

The object of the present invention is to provide binding systems which may be hardened by ionizing radiation and which will provide a higher speed of hrdening and therefore will allow industrial application of the coating process. Furthermore, the coatings provide good adhesion to ordinary substrates and good surface qualities.

The object of the present invention consists in coating compositions which will be hardened by ionizing radiation and which will contain binding agents made of a mixture of:

A. at least one unsaturated olefin compound containing urethane groups, and
B. at least one further unsaturated olefin compound which may be copolymerized, characterized in that the unsaturated olefin compound (A) is a reaction product of
a. a compound of the general formula

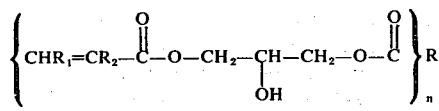

where $n$ is 1 or 2,
where R stands for a straight chain or branched alkyl group of valence $n$,
the R stands for hydrogen or methyl or the group

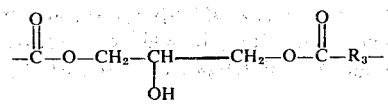

where $R_3$ is a monovalent alkyl group and where $R_2$ is hydrogen or methyl, and b. of a compound containing at least 1 isocyanate group where the mixture of (A) and (B) if necessary may contain additives conventional in the lacquer industry.

The perferred embodiment of the coating compositions of the present invention consist in making use of a compound (a) of the above general formula for preparing component (A); wherein $n$ equals 1 and R is a monovalent branched alkyl group containing in the $\alpha$ position to the carboxylic acid grouping a tertiary carbon atom, said alkyl group containing at least 4, and preferably 8–10 carbon atoms, and where at least 1 ester of acrylic or methacrylic acid with mono- or polyvalent alcohols is used as component (B).

The coating compositions of the present invention will harden more rapidly when exposed to ionizing radiation than those coating compositions containing urethane groups that are known and have been proposed for that purpose. The coatings of the present invention are elastic and adhere well to wood, plastic and metal surfaces, and furthermore show good surface properties.

The following is an explanation regarding the constituent components of the coating compositions of the invention.

A. compounds containing olefin urethane groups of the invention are such, which will be obtained, by reacting (a) an olefin unsaturated compound containing hydroxyl groups and the general formula

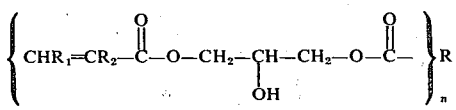

where $n$ equals 1 or 2 and where R stands for a straight chain or branched alkyl group with a valence of $n$, and where $R_1$ stands for hydrogen, a methyl group or the group

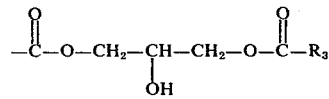

where $R_3$ is a monovalent alkyl group and where $R_2$ stands for hydrogen or methyl group with b. a compound containing a least 1 isocyanate group.

The following may be considered as monovalent alkyl groups of component (a), namely straight chain or branched, saturated or singly or multiply unsaturated hydrocarbon groups with 1–19 carbon atoms, such as are found as constitutuent parts of monocarboxylic acids, for instance of acetic acid, of propionic acid, of butyric acid, isobutyric acid, pivalinic acid, valeric acid, isovaleric acid, caproic acid, isocaproic acid, 2-ethyl hexane acid, onanthanic acid, pelargonic acid, capric acid, caprylic acid, 2-dimethyl caprylic acid, lauric acid, palmitic acid, stearic acid, oleic acid, ricinic acid and linoleic acid. Preferably used are monovalent alkyl groups R which will contain a tertiary carbon atom in the alpha position to carboxylic acid group.

Suitable divalent groups R are straight chain and branched if necessary singly or multiply unsaturated olefin alkyl groups with 2–34 carbon atoms, such as found to be constituents of corresponding dicarboxylic acids, for instance malonic acid, succinic acid, glutaric acid, adipic acid, sibasic acid, maleic acid, fumaric acid, itoconic acid, hepta-decane-dicarboxylic acid, dimerized fatty acids or tetra-hydro-phthalic acid, hexa-hydro-phthalic acid, 2,3-dicarboxy-1,4-endomethylene-1,4,5,6,7,7-hexa-chloro-cyclo-hexene-(5,6), phthalic acid, isophthalic acid and terephthalic acid.

Compounds suitable as component (a) may be prepared at temperatures from 50° – 150°C if necessary by adding a catalyst such as triethylamine, benzyl-dimethylamine and 1,4-diazabicyclo-(2,2,2) octane, by reacting glycidyl ester of the general formula

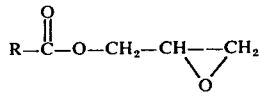

where R is a monovalent alkyl residue as discussed above with α,β-unsaturated monocarboxylic acids, for instance acrylic acid or methacrylic acid, or dicarboxylic acids, for instance

so as to form compounds

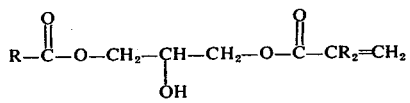

($R_2$ = H or $CH_3$), respectively

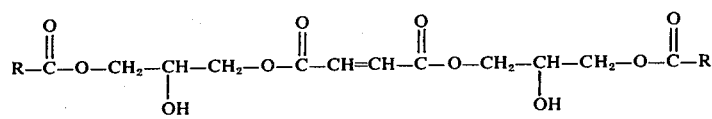

Another possibility in achieving such compounds consists in reacting glycidyl esters of α,β-olefin unsaturated carboxylic acids for instance

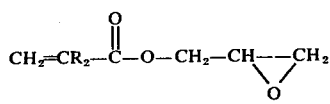

where $R_2$H or $CH_3$ may be reacted with monocarboxylic acids

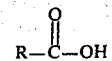

where R has the same significance as above.

Especially preferred as component (a) are the reaction products of (meth-) acrylic glycidyl ester and carboxylic acids with a branched alkyl group provided with a tertiary carbon atom in the alpha position of the carboxyl group, for instance "Versatic Acid" (Registered Trademark) with 9 or 11 carbon atoms respectively, the reaction products of (meth) acrylic acid and glycidyl ester, wherein the carboxylic acid contains tertiary carbon atoms in the alpha position (for instance Versatic glycidyl ester).

Component (b) which will be reacted with (a) into the compounds containing the urethane groups, may be drawn from compounds with at least one, preferably 2 or 3 isocyanate groups. These isocyanate groups may be bound to aliphatic, aromatic, araliphatic or alicyclic hydrocarbons or other groups.

Examples of suitable isocyanates are hexa-methylene-diisocyanate, isophorone-diisocyanate, 2,4- or 2,6-toluylene-diisocyanate and 2,2,4-trimethyl-hexane Component (a) is reacted with component (b) in general in equivalent amounts with respect to hydroxyl and isocyanate groups respectively; however, either component may be reacted in excess or in deficiency by 20 percent.

The reaction of (a) with (b) may be performed at temperatures from 0° to 150°C and if necessary in the presence of inert solvents by adding a suitable catalyst, for instance 1,4-diazobicyclo-(2,2,2) octane. When inert solvents are used, if necessary, esters or ether alcohol esters, the solvent being used must be removed, if necessary in vacuum prior to adding component (B). It may also be advantageous to perform the addition reaction in the presence of all or part of component (B).

Copolymerizable unsaturated olefin compounds to be mixed with component (A) may be conventional singly or multiply olefin unsaturated copolymerizable compounds that are liquid or solid at room temperature, if necessary vinyl compounds such as the vinyl aromatics, for example styrene, vinyl toluol, divinyl benzoyl, α-methyl styrene, vinyl heterocyclene such as vinyl pyridine, vinyl pyrolidone, vinyl caprolactam, derivatives of acrylic and methacrylic acids such as the esters of acrylic and methacrylic acids with mono- and multivalent, especially divalent straight chain branced or cyclic alcohols, which may contain ether groups and from 1–18, preferably 1–8 carbon atoms, for instance acrylic acid methyl ester, acrylic acid ethyl ester, acrylic acid propyl ester, acrylic acid isopropyl ester, acrylic acid-n-butyl ester, acrylic acid isobutyl ester, acrylic acid tertiary butyl ester, acrylic acid hexyl ester, acrylic acid cyclohexyl ester, acrylic acid -2-ethylhexyl ester, acrylic acid nonyl ester, acrylic acid decyl ester, acrylic acid dodecyl ester, and acrylic acid octadecyl ester, methacrylic acid methl ester, methacrylic acid butyl ester, furthermore glycol diacrylate, glycol dimethacrylate, 1,2- or 1,3-propane diol-diacrylate, butane diol diacrylate, and furthermore the diacrylates of hexane diol, diethylene glycol, triethylene glycol, dipropylene glycol, neopentyl glycol, pentaerythrite, triacrylate, pentaerythrite tetraacrylate, trimethyl propane diacrylate, trimethyl propane triacrylate, the corresponding dimethacrylates of diols, the diol monoesters of acrylic and methacrylic acids, for instance the mono- or methacrylates of propylene glycol, diethylene glycol monoacrylate, esters such as fumaric acid dialkyls, for instance fumaric acid dibutyl esters, and mixtures of these compounds. The following will be suited as solvents in at least one of the monomers cited above; acrylamide, methacrylamide, and the etherized methylolization products containing alcohols with 1 to 8 carbon atoms as need may be, furthermore, in minor amounts up to 30 percent by weight with respect to the total amount of component (B) or the mixture of such components, unsaturated olefin carboxylic acids such as acrylic acid, methacrylic acid, itaconic acid, or maleic acid, semi-esters.

The preferred compounds for component (B) are the mono- and di-esters of acrylic and methacrylic acids with diols containing from 2–10 carbon atoms and/or the esters of acrylic acid with a mono-alkanol containing from 4–10 carbon atoms.

In general the mixtures (A) and (B) acting as the binding agent in the coating material of the invention will comprise component (A) in the amount from 10–90, preferably from 45–80 percent by weight component (B) being present in an amount from 90–10, preferably from 55–20 percent by weight.

The following pigments and fillers may be used in conjunction with the coating composition of the invention and conventional additives may be titanium dioxide, iron oxide, phthalocyamine, talcum, calcium carbonate, and these generally will be present in amounts up to 90 percent by weight with respect to (A) and (B). Mixtures (B) furthermore will contain minor amounts up to 20 percent by weight with respect to (A) and (B), of soluble dyes such as "Neozaponfeuerrot," "Sudanblau" (BASF products), the flow improvers such as butyl lactate or silcone oils, foaming or frothing suppressors, conventional softeners such as phthalates or adipates, conventional organic solvents such as aromatics, alcohols, esters or ketones, polymerization inhibitors such as hydroquinone, p-tertiary butyl pyrocatechin and/or frosting means such as highly dispersed silicon dioxide.

Preparation of homogeneous mixtures from individual compounds is obtained by mixing the latter into conventional aggregates.

The coating composition of the invention is suited for coating metallic surfaces such as iron, steel, aluminum, also surfaces of glass, ceramic, porcelain, wood, paper, plastics, both for porous and for smooth surfaces.

Conventional deposition processes may be used for coating in accordance with the invention in fluid condition, if necessary spraying, dipping, flooding, rolling, spreading or pouring.

It was found appropriate that the coating composition be deposited in a layer thickness up to 500 microns, especially from 20–200 microns.

Alpha rays, X-rays, gamma rays, as well as the mixed radiation and preferably the electron beams released from nuclear resistors are suitable as ionizing radiation for hardening the coatings.

Examples of suitable radiation sources are cobalt 60, nuclear reactors and as regards electron beams, Van de Graff generators and other commercially available electron beams. The conventional systems generating ionizing radiation and electric beams are described among others, in A. Charlesby, "Atomic Radiation and Polymers," 1960, Pergamont Press, Oxford. The radiation energy being applied depends upon the layer thickness of the coatings to be hardened. Electron beams generated with an acceleration potential of 100–500, especially 150–400 KV are found particularly advantageous for the process of the invention. To some extent the radiation doses required for hardening depends on the composition of the mixture of unsaturated olefin organic compounds, though generally it will fall between the range of 1–50, and preferably below 20 Mrad. Especially when there is a lack of aromatic structures, relatively low doses will suffice. Radiation will appropriately be performed in the absence of air (for instance in an atmosphere of an inert gas or by covering with foil).

Time of raidation depends upon the intensity of radiation, the distance between radiation sources and coating to be hardened, and the latter thickness. A system will be appropriately used for hardening in conformity with the invention, wherein the substrate with the coating to be hardened will be conveyed underneath the radiation source on a moving band. When such suitable lacquering facilities are used, band speeds up to 60 m per minute may be achieved as regards the coating material of the invention.

The coating means of the invention is characterized by easy handling, high rate of hardening and very advantageous properties as concerns the coatings so obtained. The coatings of the invention show adhesion to the substrate, scant tendency to coloring, good resistance to solvents and good mechanical properties. The process of the invntion furthermore allows to control elasticity and condesity of reticulation.

DESCRIPTION OF THE PREFERRED EMBODIMENT

Parts and percentages listed in the Examples below respectively are parts by weight and percent by weight

EXAMPLE 1

250 parts of a glycidyl ester of a mixture of alpha branched, tertiary carboxylic acids with 9–11 carbon atoms (for instance Cardura E of German Shell) and 72 parts of acrylic acid with 0.1 part hydroquinone are heated to 40°C in a four-necked flask. 0.25 parts triethlamine are added as catalyst and the temperature is raised to 100°C. At acid No. 0, the preparation is cooled to room temperature and subsequently 87 parts of toluylene diisocyanate are slowly added drop-by-drop in a nitrogen atmosphere with constant stirring that the temperature does not exceed 30°C. When being reacted with the diisocyanate, a catalyst may be added in the form of triethylene diamine (1,4-diazobicyclo(2,2,2) octane ("Dabco"). The reaction product so obtained will be divided into two parts and will each time be dissolved to 75 percent in (a) butane diol-1,4-diacrylate (b) 2-hydroxy-ethylacrylate.

These solutions prepared according to (a) and (b) are deposited as a thickness of approximately 60 microns on a pretreated steel plate and are exposed in an inert atmosphere to a 300 Kv electron beam system with 50 mA current. The speed of the band on which the test samples are being conveyed through the irradiation room may be raised to 60 m per minute. Hard, adhesion free and scratch proof coatings characterized by good adhesion, elasticity and resistance to solvents are obtained at once.

EXAMPLE 2.

The process of Example 1 is repeated, however the toluylene diisocyanate is replaced by an equimolar amount of isphoron diisocyanate. The products obtained show the same good hardened properties as in Example 1. However, they are of higher resistance with respect to ambience.

EXAMPLE 3

The process of Example 1 is repeated, however the toluylene isocyanate is replaced by an equimolar amount of hexamethylene-diisocyanate. Products comparable to those of Example 2 are obtained.

We claim:
1. In coating compositions hardenable by ionizing radiation comprising as binding agents a mixture of
  A. at least 1 unsaturated olefin compound containing urethane groups, and
  B. at least 1 further unsaturated olefin compound that may be copolymerized,
the improvement comprising said unsaturated olefin compound (A) containing the urethane groups consisting essentially of a reaction product of
  a. a compound of the general formula

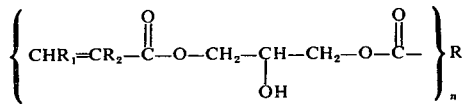

wherein $n$ is 1 or 2, where R stands for a straight chain or branched alkyl group of valence $n$, where $R_1$ is hydrogen, methyl or the group

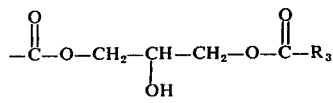

where $R_3$ is a monovalent alkyl group and where $R_2$ is hydrogen or methyl, and
  b. a compound containing at least 1 isocyanate group.

2. The compositions of claim 1, wherein the term R in the general formula for component (A) (a) denotes a branched alkyl group with at least 4 carbon atoms and contains a tertiary carbon atom in the $\alpha$ position to the carboxylic acid ester group.

3. the composition of claim 1, wherein copolymerizable component (B) is selected from the group consisting of esters of acrylic acid with monovalent alcohols, esters of acrylic acid with multivalent alcohols, esters of methacrylic acid with monovalent alcohols and esters of methacrylic acid with multivalent alcohols.

4. The composition of claim 1, wherein copolymerizing component (B) is selected from the group consisting of esters of acrylic acid with divalent alcohols, and esters of methacrylic acid with divalent alcohols.

5. The composition of claim 1, wherein said compound containing at least 1 isocyanate group (b) is selected from the group consisting of hexa-methylene-diisocyanate, isophorone-diisocyanate, 2,4-toluylene-diisocyanate, 2,6-toluylene-diisocyanate, and 2,2,4-trimethyl-hexane-diisocyanate.

6. A method of coating a substrate comprising hardening by ionizing radiation coating compositions comprising as binding agents a mixture of
  A. at least 1 unsaturated olefin compound containing urethane groups, and
  B. at least 1 further unsaturated olefin compound that may be copolymerized,
the improvement comprising said unsaturated olefin compound (A) containing the urethane groups consisting essentially of a reaction product of
  a. a compound of the general formula

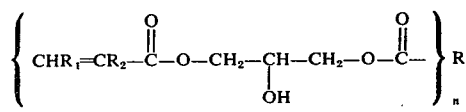

wherein $n$ is 1 or 2, where R stands for a straight chain or branched alkyl group of valence $n$, where $R_1$ is hydrogen, methyl or the group

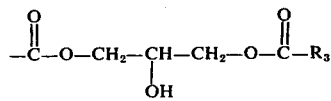

where $R_3$ is a monovalent alkyl group and where $R_2$ is hydrogen or methyl, and
  b. a compound containing at least 1 isocyanate group.

* * * * *